United States Patent
Syme et al.

(10) Patent No.: US 8,121,910 B2
(45) Date of Patent: Feb. 21, 2012

(54) AUTOMATIC LOANER PART REPLACEMENT TO PREVENT SYSTEM CALLBACK

(75) Inventors: Fraser Allan Syme, Rochester, MN (US); William Robert Taylor, Rochester, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 12/204,097

(22) Filed: Sep. 4, 2008

(65) Prior Publication Data

US 2010/0057594 A1   Mar. 4, 2010

(51) Int. Cl.
*A01K 5/02* (2006.01)
*G06F 17/60* (2006.01)

(52) U.S. Cl. .......................... 705/29; 705/28
(58) Field of Classification Search ............. 705/29
See application file for complete search history.

(56) References Cited

U.S. PATENT DOCUMENTS

| | | | |
|---|---|---|---|
| 6,684,119 B2 | 1/2004 | Burnard et al. | |
| 2001/0043063 A1 | 11/2001 | Kochi | |
| 2003/0055753 A1 | 3/2003 | Dellar et al. | |
| 2003/0139982 A1 | 7/2003 | Schwartz et al. | |
| 2003/0182299 A1* | 9/2003 | Burns | 707/102 |
| 2004/0088141 A1 | 5/2004 | Ashley | |
| 2004/0103048 A1* | 5/2004 | Vitulli et al. | 705/28 |
| 2006/0206373 A1 | 9/2006 | Blair et al. | |

OTHER PUBLICATIONS

Device and Method for Electronic Data Conversion, EP 1730928, Dec. 13, 2006 to Kamphausen, Ralf.*

* cited by examiner

*Primary Examiner* — Garcia Ade
(74) *Attorney, Agent, or Firm* — Yee & Associates, P.C.; Steven L. Bennett

(57) ABSTRACT

A system for automatically replacing loaner parts within a loaner system to prevent loaner system callback. In response to selecting a loaner system within loaner inventory data, it is determined whether the selected loaner system is required to be returned based on a target return date for the selected loaner system. In response to determining that the selected loaner system is not required to be returned, a notification is automatically generated and sent to a customer to return expiring loaner parts within the selected loaner system based on loaner part rules. A part replacement order is automatically generated for replacement loaner parts for each of the expiring loaner parts. Then, the replacement loaner parts are automatically shipped to the customer to replace the expiring loaner parts to prevent callback of the selected loaner system.

12 Claims, 11 Drawing Sheets

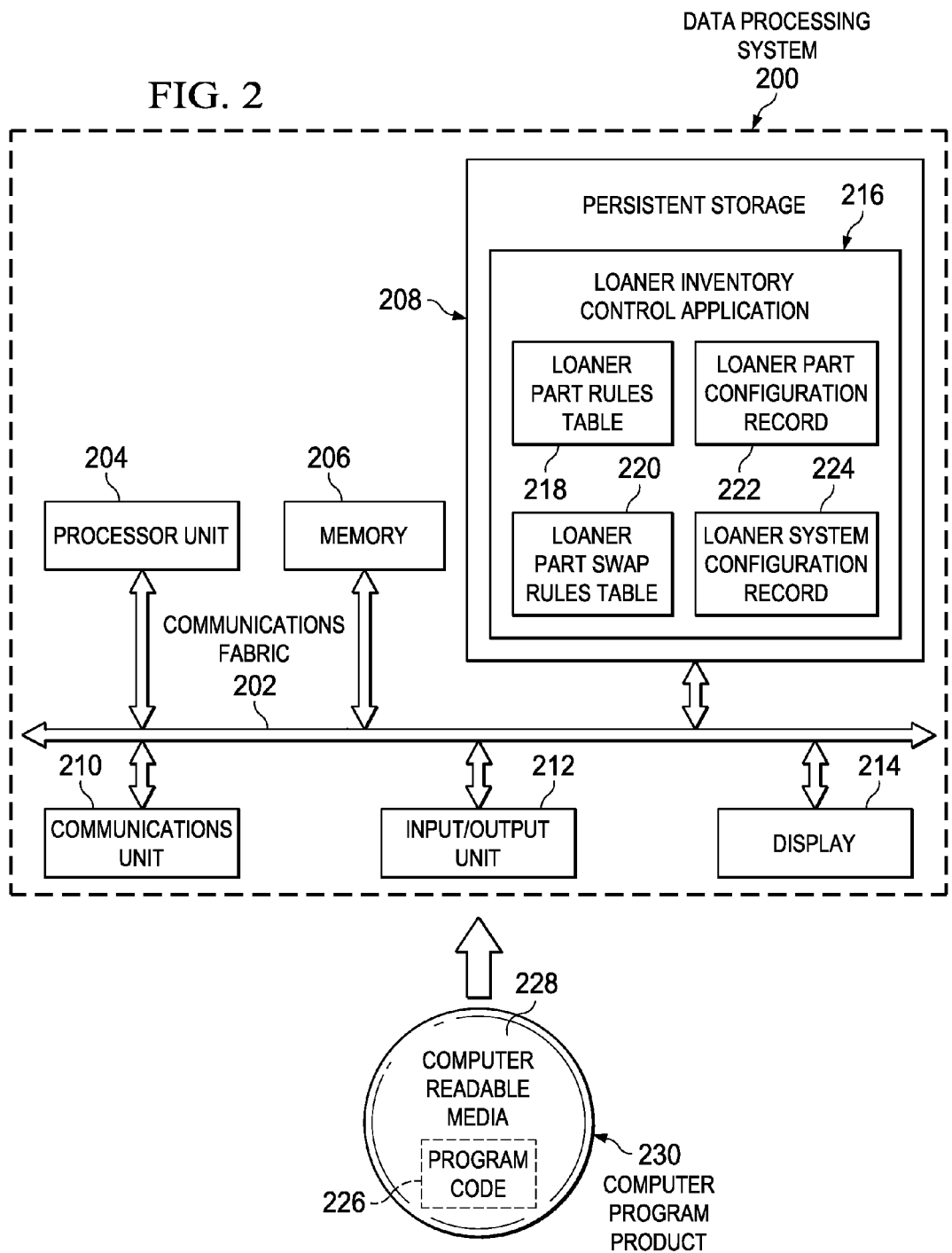

LOANER PART
SWAP RULES TABLE
400

| FIELD | VALUE | DESCRIPTION |
|---|---|---|
| 402 — PRODUCT ID | STRING | MACHINE TYPE/MODEL |
| 404 — PART NUMBER | STRING | PART NUMBER |
| 406 — SWAPPABLE | YES OR NO | DEFINES IF A PART CAN BE SWAPPED TO EXTEND A LOANER SYSTEM |

FIG. 4

LOANER PART
CONFIGURATION RECORD
500

| FIELD | VALUE | DESCRIPTION |
|---|---|---|
| 502 — SYSTEM ID | STRING | SYSTEM ID |
| 504 — MACHINE TYPE | STRING | MACHINE TYPE |
| 506 — SERIAL NUMBER | STRING | SERIAL NUMBER |
| 508 — PART NUMBER | STRING | PART NUMBER |
| 510 — PART SERIAL NUMBER | STRING | PART SERIAL NUMBER |
| 512 — SHIP DATE | DATE | ACTUAL SHIP DATE |
| 514 — TARGET RETURN DATE | DATE | TARGET RETURN DATE |
| 516 — ACTUAL RETURN DATE | DATE | ACTUAL RETURN DATE |
| 518 — REPLACEMENT PART DATE | DATE | DATE THE REPLACEMENT PART ORDER WAS GENERATED |
| 520 — CONTACT NAME | STRING | CUSTOMER NAME |
| 522 — CONTACT PHONE | STRING | CUSTOMER PHONE NUMBER |
| 524 — CONTACT ACCOUNT CODE | STRING | CUSTOMER ACCOUNT CODE |
| 526 — FIRST RETURN NOTIFICATION | DATE | DATE WHEN THE FIRST RETURN NOTIFICATION WAS SENT |
| 528 — LAST RETURN NOTIFICATION | DATE | DATE WHEN THE LAST RETURN NOTIFICATION WAS SENT |

FIG. 5

LOANER SYSTEM
CONFIGURATION RECORD
600

| FIELD | VALUE | DESCRIPTION |
|---|---|---|
| 602 SYSTEM ID | STRING | SYSTEM ID |
| 604 MACHINE TYPE | STRING | MACHINE TYPE |
| 606 SERIAL NUMBER | STRING | SERIAL NUMBER |
| 608 ORDER NUMBER | STRING | ORIGINAL ORDER NUMBER USED TO BUILD CONFIGURATION |
| 610 SHIP DATE | DATE | ACTUAL SHIP DATE |
| 612 MANDATORY RETURN DATE | DATE | MANDATORY RETURN DATE |
| 614 TARGET RETURN DATE | DATE | TARGET RETURN DATE |
| 616 ACTUAL RETURN DATE | DATE | ACTUAL RETURN DATE |
| 618 CONTACT E-MAIL | STRING | CUSTOMER E-MAIL ADDRESS |
| 620 CONTACT NAME | STRING | CUSTOMER NAME |
| 622 CONTACT PHONE | STRING | CUSTOMER PHONE NUMBER |
| 624 CONTACT ACCOUNT CODE | STRING | CUSTOMER ACCOUNT CODE |
| 626 FIRST RETURN NOTIFICATION | DATE | DATE WHEN THE FIRST RETURN NOTIFICATION WAS SENT |
| 628 LAST RETURN NOTIFICATION | DATE | DATE WHEN THE LAST RETURN NOTIFICATION WAS SENT |

FIG. 6

AUTOMATIC LOANER PART REPLACEMENT TO PREVENT SYSTEM CALLBACK

BACKGROUND OF THE INVENTION

1. Field of the Invention

The present invention relates generally to an improved data processing system and more specifically to a computer implemented method, system, and computer usable program code for automatically replacing loaner parts within a loaner system to prevent loaner system callback.

2. Description of the Related Art

Today, it is common practice for a manufacturing department within an enterprise to loan configured systems, and sometimes parts, to other various internal departments within the enterprise, such as, for example, research and development or a testing laboratory. However, legal limits exist as to the amount of time a loaner system or part may be used for research or testing and yet remain available for sale to customers as a "new" system or part. Currently, when a system is on loan, the entire system is monitored, or timed, to ensure that the legal limit is not exceeded. In order to avoid buying the loaner system, the using department must return the loaner system before the legal limit is reached. If the initial need for the loaner system will not be complete by the end of the legal time limit, which is often the case, the using department generates another loaner order and another system is built with new parts by the manufacturing department. Thus, the loaner cycle continues.

After the manufacturing department receives the returned loaner system, the manufacturing department either applies the returned loaner system to an external customer order or tears the returned loaner system apart to harvest the parts for other new customer orders. All such harvested parts are restricted from being used on other loaner systems because these harvested parts are assumed to have reached their legal usage limit as "new" parts. Consequently, loaner systems are tracked as complete entities and returned according to the shortest legal time limitation on any one of its internal parts.

BRIEF SUMMARY OF THE INVENTION

According to one embodiment of the present invention, loaner parts are automatically replaced within a loaner system to prevent loaner system callback. In response to selecting a loaner system within loaner inventory data, it is determined whether the selected loaner system is required to be returned based on a target return date for the selected loaner system. In response to determining that the selected loaner system is not required to be returned, a notification is automatically generated and sent to a customer to return expiring loaner parts within the selected loaner system based on loaner part rules. A part replacement order is automatically generated for replacement loaner parts for each of the expiring loaner parts. Then, the replacement loaner parts are automatically shipped to the customer to replace the expiring loaner parts to prevent callback of the selected loaner system.

BRIEF DESCRIPTION OF THE SEVERAL VIEWS OF THE DRAWINGS

FIG. 2 is a diagram of a data processing system in which illustrative embodiments may be implemented;

FIG. 4 is an exemplary illustration of a loaner part swap rules table in accordance with an illustrative embodiment;

FIG. 5 is an exemplary illustration of a loaner part configuration record in accordance with an illustrative embodiment;

FIG. 6 is an exemplary illustration of a loaner system configuration record in accordance with an illustrative embodiment;

DETAILED DESCRIPTION OF THE INVENTION

Figures 1, 3:
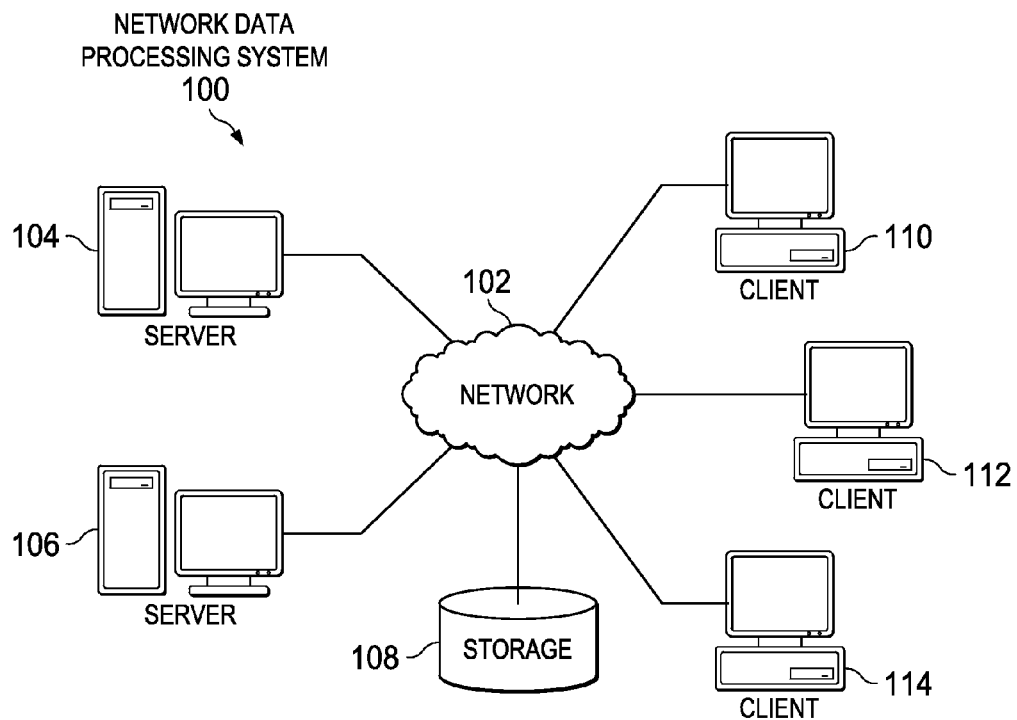
FIG. 1 is a pictorial representation of a network of data processing systems in which illustrative embodiments may be implemented.
FIG. 3 is an exemplary illustration of a loaner part rules table in accordance with an illustrative embodiment.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer-sable or computer-readable medium(s) may be utilized. The computer-usable or computer-readable medium may be, for example but not limited to, an electronic, magnetic, optical, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to data processing environments in which different illustrative embodiments may be implemented. Many modifications to the depicted environments may be made.

FIG. 1 depicts a pictorial representation of a network of data processing systems in which illustrative embodiments may be implemented. Network data processing system 100 is a network of data processing systems, such as, for example, computers and other devices, in which the illustrative embodiments may be implemented. Network data processing system 100 contains network 102. Network 102 is the medium used to provide communications links between the various computers and other devices connected together within network data processing system 100. Network 102 may include connections, such as wire, wireless communication links, or fiber optic cables.

In the depicted example, server 104 and server 106 connect to network 102, along with storage unit 108. Storage 108 represents any type of storage device that is capable of storing data in a structured or unstructured format. Also, storage 108 may represent a plurality of storage units coupled to network 102. Storage 108 may, for example, be a database that stores manufacturing inventory data and loaner inventory data for manufacturing operations of an enterprise. Manufacturing inventory data is all relevant data regarding an enterprise's part inventory. The manufacturing inventory is used to manufacture new external customer orders. Loaner inventory data is all relevant data regarding an enterprise's loaner part inventory. The loaner part inventory is used to manufacture loaner systems for internal customer orders or to replace loaner parts that reached their legal time limit as loaner parts within a previously manufactured loaner system.

Further, client devices 110, 112, and 114 also connect to network 102. Client devices 110, 112, and 114 may, for example, be personal computers, network computers, personal digital assistants (PDAs), or smart cellular telephones. Client devices 110, 112, and 114 are clients to server 104 and/or server 106 in this example.

Server 104 and/or server 106 may, for example, provide inventory control for the enterprise's manufacturing operation. In addition, server 104 and/or server 106 may, for example, send customer e-mail notifications regarding the return of loaner systems or parts to client devices 110, 112, and 114. Furthermore, server 104 and server 106 may provide other data, such as boot files, operating system images, and applications to client devices 110, 112, and 114. Moreover, network data processing system 100 may include additional servers, clients, and other devices not shown to implement processes of illustrative embodiments.

Of course, network data processing system 100 may be implemented as a number of different types of networks, such as, for example, an intranet, a local area network (LAN), a wide area network (WAN), or the Internet. Also, is should be noted that FIG. 1 is only intended as an example and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes of the illustrative embodiments may be located. In this illustrative example, data processing system 200 includes communications fabric 202, which provides communications between processor unit 204, memory 206, persistent storage 208, communications unit 210, input/output (I/O) unit 212, and display unit 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory (RAM) or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208. In addition, persistent storage 208 may represent a plurality of persistent storage units.

Loaner inventory control application 216 resides on persistent storage 208. Loaner inventory control application 216 is a software application that monitors and controls the use of parts allocated to a loaner program. An enterprise may use a loaner program to loan systems and parts to internal customers (i.e., internal departments within the enterprise) for research or testing purposes. Loaner parts are utilized to build complete loaner systems or to replace loaner parts that reached their legal time limit as a loaner part within a previously manufactured loaner system. Loaner parts that do not exceed the legal time limit for loaner use are still under warranty and are available to be installed in new external customer orders.

Loaner inventory control application 216 includes loaner part rules table 218, loaner part swap rules table 220, loaner part configuration record 222, and loaner system configuration record 224. Loaner part rules table 218 is a table that contains rules for loaner parts. A loaner part rule is the number of days a given loaner part may be legally used in the loaner program.

Loaner part swap rules table 220 is a table that contains swap rules for loaner parts. A loaner part swap rule defines whether a given loaner part may be swapped or replaced within a previously manufactured loaner system to extend the life of that loaner system in the loaner program. Loaner part configuration record 222 is a record for a given loaner part that includes all data necessary for processes of illustrative embodiments. Loaner system configuration record 224 is a record for a given loaner system that includes all data necessary for processes of illustrative embodiments. In addition, loaner system configuration record 224 may include a list of all parts, both loaner and non-loaner, that comprise a given loaner system. Further, loaner system configuration record 224 may include references to loaner part configuration records associated with installed loaner parts within a loaner system.

Communications unit 210, in these examples, provides for communications with other data processing systems or devices, such as, for example, server 104 in FIG. 1. In these examples, communications unit 210 is a network interface card. Communications unit 210 may provide communications through the use of either, or both, physical and wireless communications links.

Input/output unit 212 allows for input and output of data with other devices that may be connected to data processing system 200. For example, input/output unit 212 may provide a connection for user input through a keyboard. Display unit 214 provides a mechanism to display information to a user of data processing system 200.

Instructions for the operating system and applications or programs are located on persistent storage 208. The instructions for the operating system and applications or programs may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different illustrative embodiments may be embodied on different physical or tangible computer-readable media, such as memory 206 or persistent storage 208.

Program code 226 is located in a functional form on computer-readable media 228 and may be loaded onto or transferred to data processing system 200 for execution by processor unit 204. Program code 226 and computer-readable media 228 form computer program product 230 in these examples. In one example, computer-readable media 228 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 228 also may take the form of a persistent storage, such as a hard drive or a flash memory that is connected to data processing system 200. The tangible form of computer-readable media 228 is also referred to as computer-recordable storage media.

Alternatively, program code 226 may be transferred to data processing system 200 from computer readable media 228 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different illustrative embodiments may be implemented. The different illustrative embodiments may be implemented in a data processing system including components in addition to, or in place of, those illustrated for data processing system 200. Other components shown in FIG. 2 may be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub, which may be present in communications fabric 202.

Illustrative embodiments provide a computer implemented method, system, and computer usable program code for automatically replacing loaner parts within a loaner system to prevent loaner system callback. Instead of tracking usage of a loaner system, illustrative embodiments track usage of individual parts installed within the loaner system. Illustrative embodiments utilize this part level tracking process to optimize loaner system life and loaner part usage. As loaner parts reach their legal usage limits, illustrative embodiments automatically generate replacement part orders for these specific parts, thereby leaving a majority of the loaner system in tact. As a result, specific parts may be replaced in an existing loaner system to essentially extend the loaner system's life and delay or eliminate teardown and rebuild of the loaner system. Consequently, illustrative embodiments may eliminate a significant amount of loaner system rebuild and the cost associated with loaner system teardown.

Also, illustrative embodiments may improve loaner inventory optimization by reusing loaner parts not reaching their legal usage limit. By reusing available loaner parts, illustrative embodiments may reduce the number of parts needed in the loaner program inventory. In addition, illustrative embodiments may reduce the disruption caused by replacing entire loaner systems by only replacing expired loaner parts within loaner systems.

First, illustrative embodiments use, for example, a loaner inventory controller to ship an ordered loaner system to an internal customer or department for testing or research purposes. The using internal department requests the loaner system for a specified number of days. The manufacturing department agrees to the loan duration request for a specified number of days.

Then, the manufacturing department assembles the loaner system with parts that have remaining loaner life greater than or equal to the agreed loan duration period for the loaner system. Afterward, the loaner inventory controller initiates a tracking clock for each serialized loaner part installed within the loaner system. Further, the loaner inventory controller automatically sets a mandatory return date for the loaner system based on the earliest legal usage limit of a non-replaceable loaner part.

The loaner inventory controller monitors outstanding loaner systems on a continuous or daily basis. If a return notification date for a particular loaner system is hit, the loaner inventory controller generates and sends a notice via, for example, e-mail to the internal department to return the loaner system. If a return notification date for an expiring loaner part is hit, the loaner inventory controller identifies all loaner parts in the loaner system that will expire within a minimum system life extension period. Moreover, the loaner inventory controller generates a production order for the replacement parts and notifies the internal department of the impending shipment.

Furthermore, the internal department may request an extension of the initial loan period for the loaner system. Subsequent to notification that return shipment of the loaner system is required, the internal department may request an extension loan period. The loaner inventory control application shows the internal department a part expiration profile for the loaner system and indicates the necessary shipments/services that may be required to prevent any loaner part life expiration. The loaner inventory control application will never allow a loan period extension to exceed the mandatory system return date. If the internal department agrees to the part shipment information, then the loaner inventory control application will grant the extension.

Thus, illustrative embodiments provide: 1) the ability to manage part loaner life in an analog fashion, as opposed to a digital fashion, as parts are no longer viewed as loaner or non-loaner, but varying degrees of loaner; 2) the ability to fill a loaner system order with loaner parts that satisfy a projected life of the loaner system order, i.e. not by intended design life, but by real logistics data; 3) the ability to profile replacement loaner parts for a loaner system relevant to customer desire to extend the initial loan period, as well as a desired manufacturing benefit that includes the ability for real-time customer review prior to agreement; 4) the ability to control the life of a loaner system life through replacement part profiling based on whether parts are serviceable or replaceable within the loaner system; 5) the ability to generate part production orders based on profile results and customer agreement, to notify the customer accordingly, and to tie tracking of these new loaner parts to the loaner system currently in use before manufacturing update of install records; 6) the ability to automatically update manufacturing install records and to stop tracking of loaner parts based on receipt of returned parts; and 7) the ability to disposition the returned part for additional loaner use or not based on actual loaner use life of the returned part.

With reference now to FIG. 3, an exemplary illustration of a loaner part rules table is depicted in accordance with an illustrative embodiment. Loaner part rules table 300 may, for example, be loaner part rules table 218 in FIG. 2. Loaner part rules establish the legally permissible loaner life for each loaner part. In this illustrative example, each loaner part is identified by part number 302. The part number may, for example, be a data string, which represents the part number. However, it should be noted that loaner parts may be identified by other means as well. Further, loaner part rules table 300 includes loan duration 304. Loan duration 304 is the duration of the loan period for each respective loaner part. The loan duration is shown as an integer, such as, for example, 90, which represents the number of days a given loaner part may be used within a loaner system or machine.

With reference now to FIG. 4, an exemplary illustration of a loaner part swap rules table is depicted in accordance with an illustrative embodiment. Loaner part swap rules table 400 may, for example, be loaner part swap rules table 220 in FIG. 2. Loaner part swap rules establish whether a given part within a loaner system is replaceable by the internal customer. Loaner part swap rules table 400 includes product identification (ID) 402, part number 404, and swappable 406. Product ID 402 is shown as a data string and represents a machine type/model (MTM) of the loaner system that the associated loaner part is installed within. Part number 404 may, for example, be part number 302 in FIG. 3. Part number 404 identifies a loaner part. Swappable 406 is shown as a "Yes" or a "No" value, which defines whether a given part within a loaner system may be replaced to extend the life of the loaner system.

With reference now to FIG. 5, an exemplary illustration of a loaner part configuration record is depicted in accordance with an illustrative embodiment. Loaner part configuration record 500 may, for example, be loaner part configuration record 222 in FIG. 2. Loaner part configuration record 500 records all relevant data required by processes of illustrative embodiments for a given loaner part. Loaner part configuration record 500 includes system ID 502, machine type 504, serial number 506, part number 508, part serial number 510, ship date 512, target return date 514, actual return date 516, replacement part date 518, contact name 520, contact phone 522, contact account code 524, first return notification 526, and last return notification 528.

However, it should be noted loaner part configuration record 500 is only intended as an exemplary loaner part configuration record. In other words, illustrative embodiments are not limited to loaner part configuration record 500. Illustrative embodiments may include more or fewer entries in loaner part configuration record 500 as needed by processes of illustrative embodiments.

System ID 502 identifies the loaner system that the given loaner part is installed within. Machine type 504 identifies the type or model of the loaner system or machine associated with system ID 502. Serial number 506 is the serial number of the loaner system associated with system ID 502.

Part number 508 is the part number for the given loaner part. Part serial number 510 is the serial number associated with the given loaner part. Ship date 512 identifies the date the given loaner part was shipped to the internal customer. Target return date 514 is the date the given loaner part is scheduled to be returned by the customer. Actual return date 516 is the date that the given loaner part is actually returned to the manufacturing department. Replacement part date 518 is the date a replacement part order was generated for the given loaner part.

Contact name 520 is the name of the internal customer. Contact phone 522 is the telephone number associated with contact name 520. Contact account number 524 is the account number associated with contact name 520. First return notification 526 is the date when the first notice to return the loaner part was sent to the customer. Last return notification 528 is the date when the last notice to return the loaner part was sent to the customer.

With reference now to FIG. 6, an exemplary illustration of a loaner system configuration record is depicted in accordance with an illustrative embodiment. Loaner system configuration record 600 may, for example, be loaner system configuration record 224 in FIG. 2. Loaner system configuration record 600 records all relevant data required by processes of illustrative embodiments for a given loaner system. Loaner system configuration record 600 includes system ID 602, machine type 604, serial number 606, order number 608, ship date 610, mandatory return date 612, target return date 614, actual return date 616, contact e-mail 618, contact name 620, contact phone 622, contact account code 624, first return notification 626, and last return notification 628.

However, it should be noted loaner system configuration record 600 is only intended as an exemplary loaner system configuration record. In other words, illustrative embodiments are not limited to loaner system configuration record 600. Illustrative embodiments may include more or fewer entries in loaner system configuration record 600 as needed by processes of illustrative embodiments. For example, loaner system configuration record 600 may include references to one or more loaner part configuration records associated with loaner parts installed within the given loaner system.

System ID 602 identifies the given loaner system. Machine type 604 identifies the type or model of the loaner system associated with system ID 602. Serial number 606 is the serial number of the loaner system associated with system ID 602. Order number 608 is the order number associated with the given loaner system. Ship date 610 is the date the given loaner system was shipped to the internal customer. Mandatory return date 612 is the date whereby the given loaner system must be returned. Mandatory target date 612 is based on the earliest loaner program expiration date of an installed non-replaceable loaner part. Target return date 614 is the date the given loaner part is agreed by the customer to be returned. Actual return date 616 is the date that the given loaner system is actually returned.

Contact e-mail 618 is the e-mail address of the internal customer using the given loaner system. Contact name 620 is the name of the internal customer. Contact phone 622 is the telephone number associated with contact name 620. Contact account number 624 is the account number associated with contact name 620. First return notification 626 is the date when the first notice to return the loaner system was sent to the customer. Last return notification 628 is the date when the last notice to return the loaner system was sent to the customer.

Figure 7:
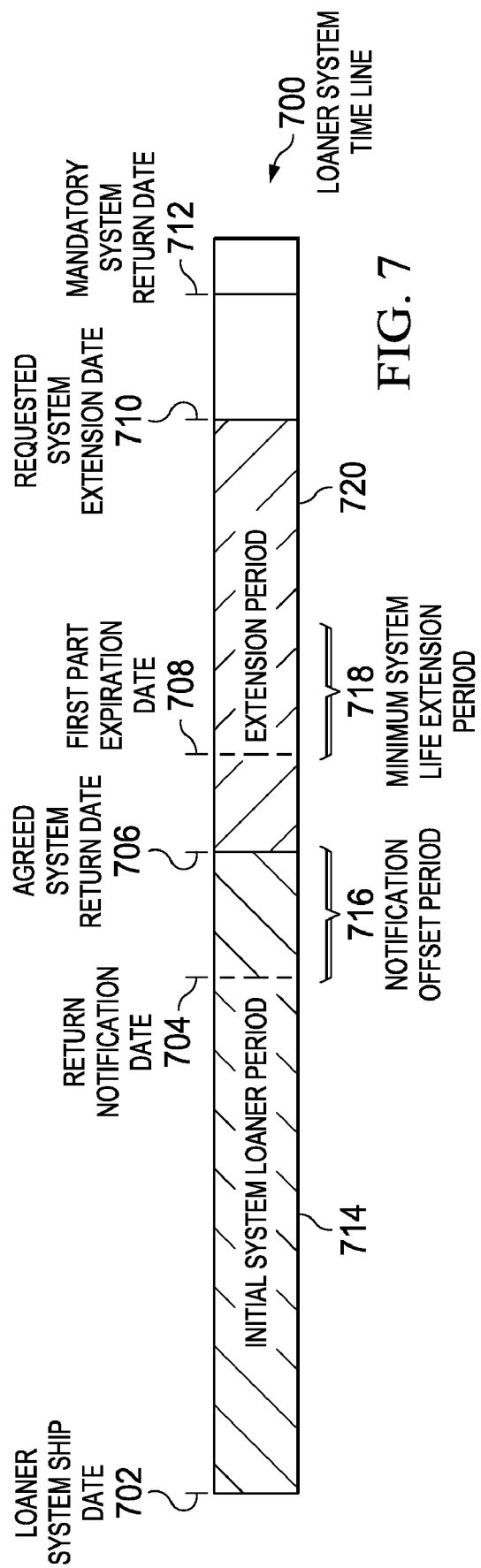
FIG. 7 is an exemplary diagram of a loaner system time line in accordance with an illustrative embodiment.

With reference now to FIG. 7, an exemplary diagram of a loaner system time line is depicted in accordance with an illustrative embodiment. Loaner system time line 700 is an exemplary time line that an illustrative embodiment may utilize to monitor and manage a given loaner system shipped to an internal customer. Loaner system time line 700 includes loaner system ship date 702, return notification date 704, agreed system return date 706, first part expiration date 708, requested system extension date 710, and mandatory system return date 712. In addition, loaner system time line 700 includes initial system loaner period 714, notification offset period 716, minimum system life extension period 718, and extension period 720.

Loaner system ship date 702 is the date a given loaner system is shipped to an internal customer for testing or research. Return notification date 704 is the date the internal customer is sent an e-mail notifying the customer to return the given loaner system. Agreed system return date 706 is the target return date that the internal customer agreed to previously.

First part expiration date 708 is the first loaner program expiration date for an installed loaner part within the given loaner system. Requested system extension date 710 represents the end of a granted extension period, which was previously requested by the internal customer. Mandatory system return date 712 represents the date that the given loaner system must be returned by the internal customer.

Initial system loaner period 714 represents the time period between loaner system ship date 702 and agreed system return date 706. Initial system loaner period 714 may, for example, be a time period of 90 days. Notification offset period 716 represents the time period between return notification date 704 and agreed system return date 706. It should be noted that notification offset period 716 is within initial system loaner period 714. Notification offset period 716 may, for example, be a time period of 20 days. During notification offset period 716, the internal customer may request to extend initial system loaner period 714.

Extension period 720 represents the time period granted as an extension to initial system loaner period 714. Extension period 720 may, for example, be a time period of 60 days. Minimum system life extension period 718 represents the minimum amount of time granted for an extension of initial system loaner period 714. Minimum system life extension period 718 may, for example, be a time period of 30 days. All loaner parts that expire during minimum system life extension period 718 will have corresponding part replacement orders generated and replacement loaner parts shipped to the internal customer for replacement of the expired parts in order to extend the loaner life of the system.

Figure 8:
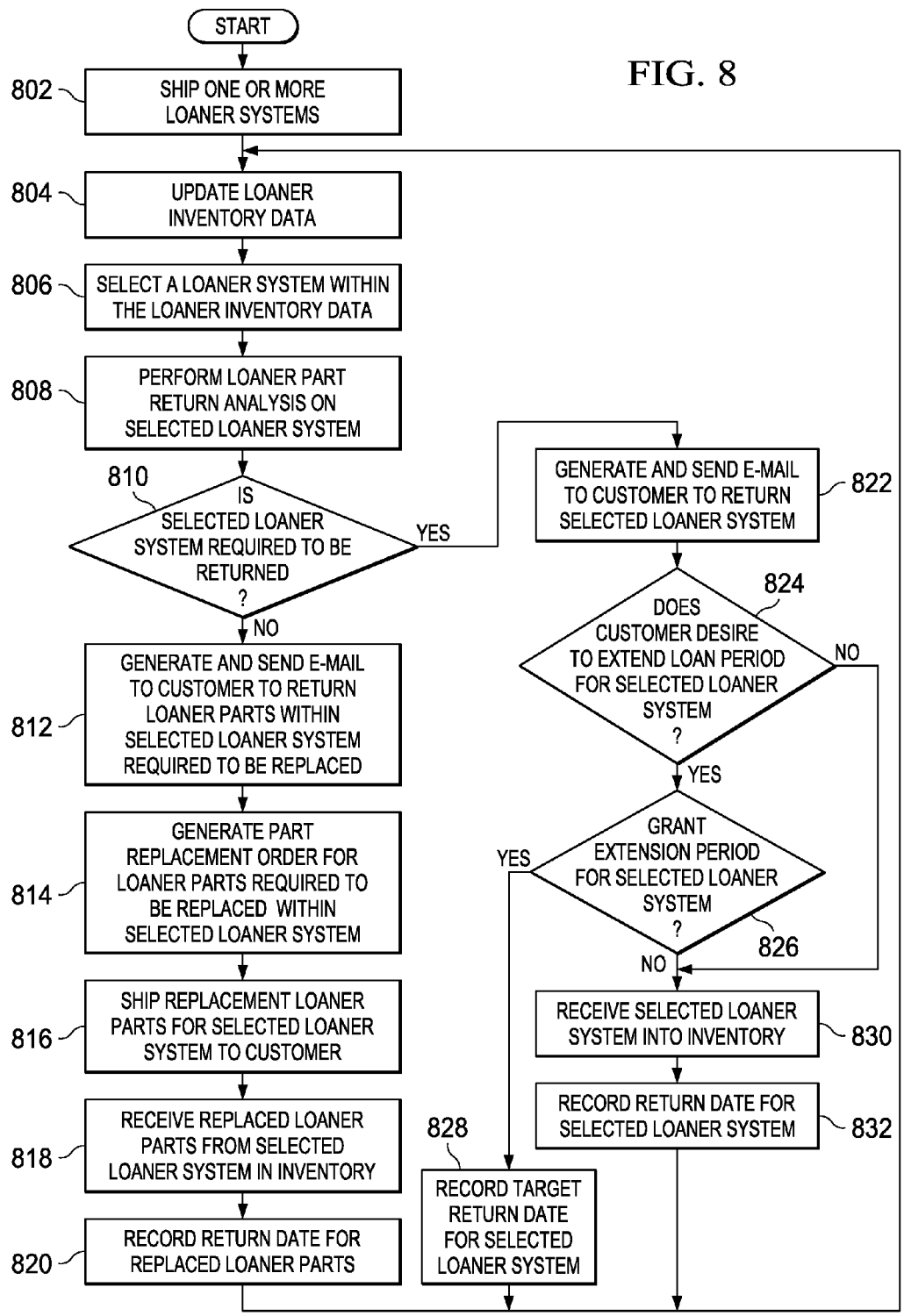
FIG. 8 is a flowchart illustrating an exemplary process for automatically replacing loaner parts within a loaner system to prevent loaner system callback in accordance with an illustrative embodiment.

With reference now to FIG. 8, a flowchart illustrating an exemplary process for automatically replacing loaner parts within a loaner system to prevent loaner system callback is shown in accordance with an illustrative embodiment. The process shown in FIG. 8 may be implemented in a loaner inventory controller, such as loaner inventory control application 216 in FIG. 2.

The process begins when the loaner inventory controller ships one or more loaner systems to a customer (step 802). The customer is, for example, an internal department within the enterprise utilizing an illustrative embodiment. After shipping the one or more loaner systems in step 802, the loaner inventory controller updates loaner inventory data (step 804). The loaner inventory controller updates the loaner inventory data with information, such as, for example, identification data for each loaner system shipped, the configuration of each loaner system as built, loaner part rules for each loaner part installed within each loaner system, date of shipment, mandatory return date for each loaner system, and customer information.

Then, the loaner inventory controller selects a loaner system listed in the loaner inventory data (step 806). Subsequent to selecting a loaner system in step 806, the loaner inventory controller performs a loaner part return analysis on the selected loaner system (step 808). Then, the loaner inventory controller makes a determination as to whether the selected loaner system is required to be returned (step 810). If the selected loaner system is not required to be returned, no output of step 810, then the loaner inventory controller generates and sends an e-mail or other form of communication to notify the customer to return expiring loaner parts within the selected loaner system required to be replaced due to legal time limits (step 812).

Afterwards, the loaner inventory controller generates a part replacement order for each loaner part required to be replaced within the selected loaner system (step 814). Subsequently, the loaner inventory controller ships the replacement loaner parts for the selected loaner system to the customer (step 816). After receiving the replacement loaner parts, the customer installs the replacement parts and sends the replaced loaner parts back to the manufacturing department. Then, the loaner inventory controller receives the replaced loaner parts from the selected loaner system into inventory (step 818). Then, the loaner inventory controller records the actual return date for the replaced loaner parts (step 820). Thereafter, the process returns to step 804 where the loaner inventory controller updates the loaner inventory data with the return date for each of the replaced loaner parts.

Returning again to step 810, if the selected loaner system is required to be returned, yes output of step 810, then the loaner inventory controller generates and sends an e-mail to the customer to return the selected loaner system (step 822). Afterward, the loaner inventory controller makes a determination as to whether the customer desires to extend the initial loan period for the selected loaner system (step 824). If the customer does not desire to extend the loan period for the selected loaner system, no output of step 824, then the process proceeds to step 830. If the customer does desire to extend the loan period for the selected loaner system, yes output of step 824, then the loaner inventory controller makes a determination as to whether to grant the extension period for the selected loaner system based on the customer viewing and agreeing to a part expiration profile that indicates all required replacement part shipments to prevent any loaner part expiration in the selected system (step 826).

If the loaner inventory controller does grant the extension period for the selected loaner system, yes output of step 826, then the loaner inventory controller records the target return date for the selected loaner system (step 828). Thereafter, the process returns to step 804 where the loaner inventory controller updates the loaner inventory data with the target return date for the selected loaner system. If the loaner inventory controller does not grant the extension period for the selected loaner system, no output of step 826, then the loaner inventory controller subsequently receives the selected loaner system into inventory (step 830). Then, the loaner inventory controller records the actual return date for the selected loaner system (step 832). Thereafter, the process returns to step 804 where the loaner inventory controller updates the loaner inventory data with the actual return date of the selected loaner system. It should be noted that the loaner inventory controller executes this analysis process on a continuous or daily basis.

Figure 9:
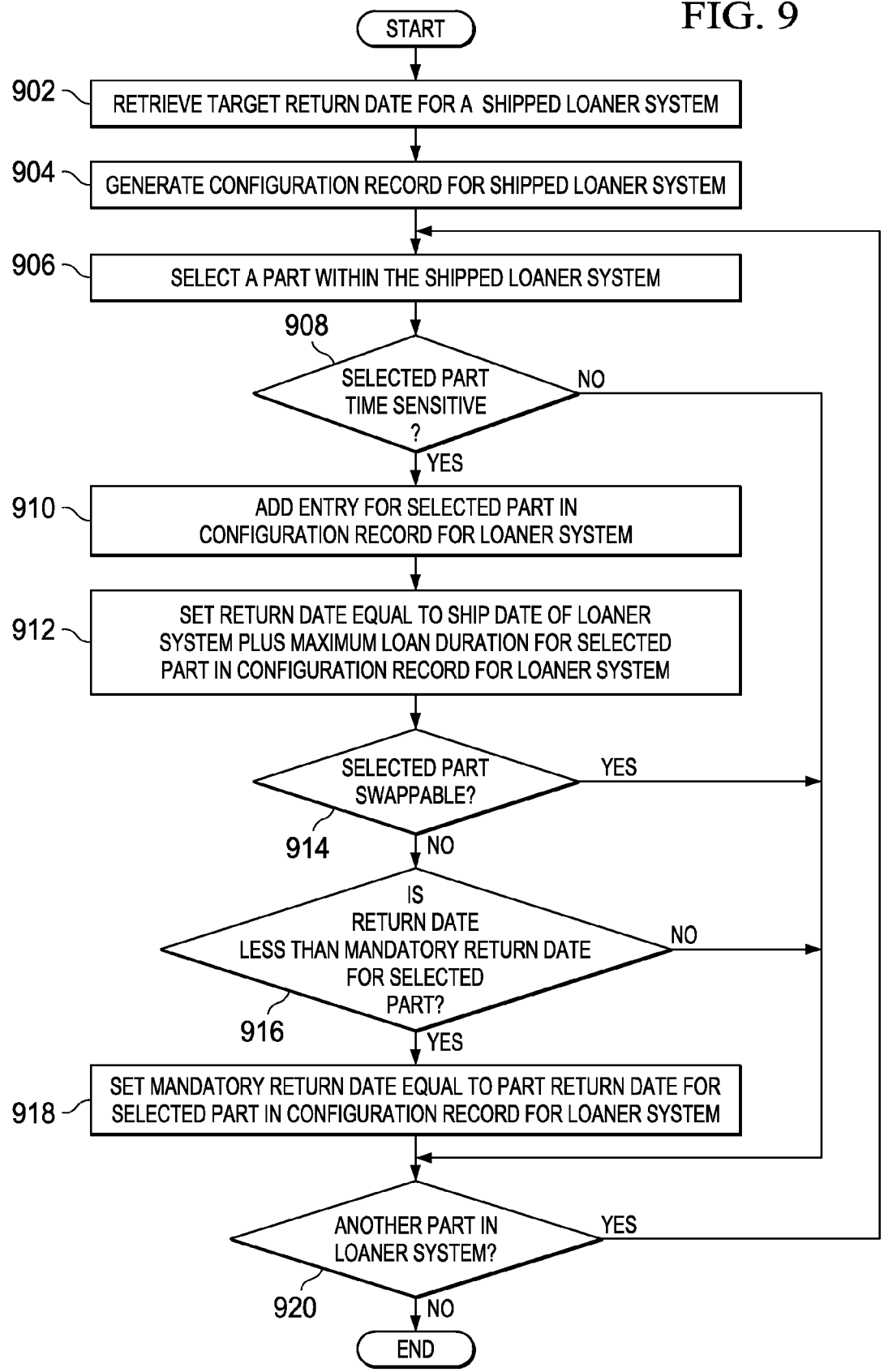
FIG. 9 is a flowchart illustrating an exemplary process for updating loaner system configuration data in accordance with an illustrative embodiment.

With reference now to FIG. 9, a flowchart illustrating an exemplary process for updating loaner system configuration data is shown in accordance with an illustrative embodiment. The process shown in FIG. 9 may be implemented in a loaner inventory controller, such as loaner inventory control application 216 in FIG. 2. Also, the process shown in FIG. 9 may be implemented in step 804 of FIG. 8.

The process begins when the loaner inventory controller retrieves a target return date for a shipped loaner system (step 902). After retrieving the target return date in step 902, the loaner inventory controller generates a configuration record, such as loaner system configuration record 600 in FIG. 6, for the shipped loaner system (step 904). Then, the loaner inventory controller selects a part within the shipped loaner system utilizing configuration data for the shipped loaner system located in the loaner inventory data (step 906).

Subsequent to selecting the part in step 906, the loaner inventory controller makes a determination as to whether the selected part is time sensitive (step 908). The loaner inventory controller utilizes a loaner part rules table, such as loaner part rules table 300 in FIG. 3, to determine if the selected part is time sensitive. However, it should be noted that if a selected part is not defined in the loaner part rules table, then the loaner inventory controller assumes that the selected part is not time sensitive. If the selected part is not time sensitive, no output of step 906, then the process proceeds to step 920. If the selected part is time sensitive, yes output of step 906, then the loaner inventory controller adds an entry for the selected part in the configuration record for the loaner system (step 910). Afterward, the loaner inventory controller sets the return date equal to the ship date of the loaner system plus the maximum loan duration for the selected part in the configuration record for the loaner system (step 912).

Subsequently, the loaner inventory controller makes a determination as to whether the selected part is swappable or replaceable (step 914). If the selected part is swappable, yes output of step 914, then the process proceeds to step 920. If the selected part is not swappable, no output of step 914, then the loaner inventory controller makes a determination as to whether the return date is less than the mandatory return date for the selected part (step 916). A mandatory return date is a date by which the loaner system must be returned to the manufacturing department and is based on the earliest non-replaceable loaner part time limit expiration. If the part is not returned prior to the end of the loaner program legal time limit, then the customer or using internal department is required to purchase the loaner system or part because the loaner system or part may no longer be installed in a new external customer order or re-used in the loaner program.

If the return date is not less than the mandatory return date for the selected part, no output of step 916, then the process proceeds to step 920. If the return date is less than the mandatory return date for the selected part, yes output of step 916, then the loaner inventory controller sets the mandatory return date equal to the part return date for the selected part in the configuration record for the loaner system (step 918). Afterward, the loaner inventory controller makes a determination as to whether another part exists in the loaner system (step 920). If another part does exist in the loaner system, yes output of step 920, then the process returns to step 906 where the loaner inventory controller selects another part within the shipped loaner system. If another part does not exist in the loaner system, no output of step 920, then the process terminates thereafter.

Figure 10:
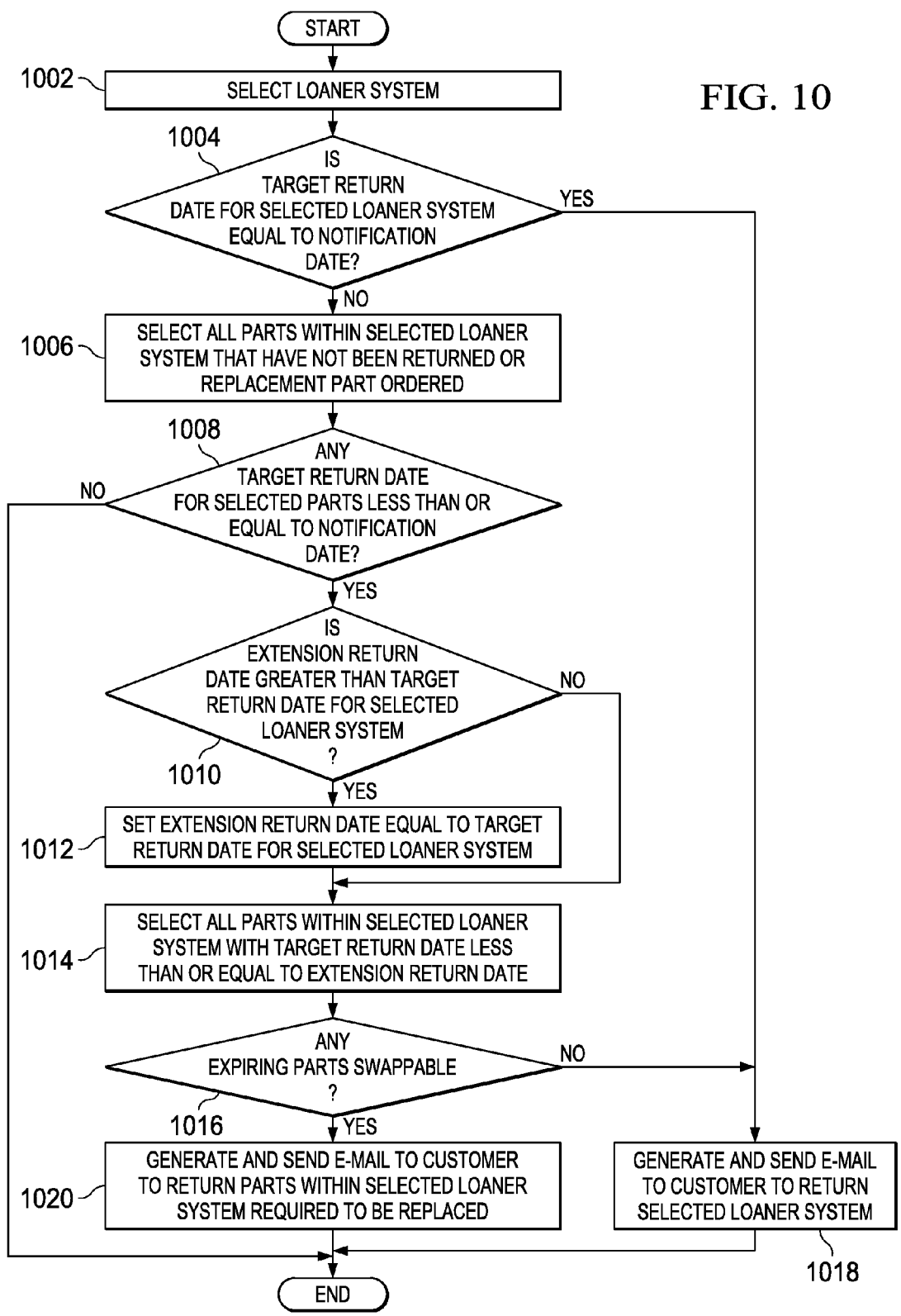
FIG. 10 is a flowchart illustrating an exemplary process for sending loaner system or loaner part return notifications in accordance with an illustrative embodiment.

With reference now to FIG. 10, a flowchart illustrating an exemplary process for sending loaner system or loaner part return notifications is shown in accordance with an illustrative embodiment. The process shown in FIG. 10 may be implemented in loaner inventory controller, such as loaner inventory control application 216 in FIG. 2. Also, the process shown in FIG. 10 may be implemented in steps 812 and 822 of FIG. 8.

The process begins when the loaner inventory controller selects a loaner system in the loaner inventory data that has been shipped to a customer (step 1002). After selecting a loaner system in step 1002, the loaner inventory controller makes a determination as to whether the target return date for the selected loaner system is equal to the notification date (step 1004). A target return date is a date agreed upon by the manufacturing department and the customer to return the loaner system or parts. The target return date is prior to the mandatory return date. The notification date is the date on which the loaner inventory controller sends the customer a notice via e-mail regarding the return of the loaner system or part and is equal to the current date plus a notification offset. A notification offset is a predetermined amount of time, such as, for example, 20 days, before the customer is scheduled to return the loaner system or part.

If the target return date for the selected loaner system is equal to the notification date, yes output of step 1004, then the process proceeds to step 1018. If the target return date for the selected loaner system is not equal to the notification date, no output of step 1004, then the loaner inventory controller selects all parts within the selected loaner system that have not been returned or replacement part ordered (step 1006). Afterward, the loaner inventory controller makes a determination as to whether any target return date for the selected parts is less than or equal to the notification date (step 1008). If all target return dates for the selected parts are not less than or equal to the notification date, no output of step 1008, then the process terminates thereafter. If any target return date for the selected parts is less than or equal to the notification date, yes output of step 1008, then the loaner inventory controller makes a determination as to whether an extension return date is greater than the target return date for the selected loaner system (step 1010).

An extension return date is equal to a first part return date plus a minimum system life extension period. A minimum system life extension period is the minimum amount of time, such as, for example, 30 days, that the manufacturing department will grant an extension of time for a given loaner system. If the extension return date is not greater than the target return date for the selected loaner system, no output of step 1010, then the process proceeds to step 1014. If the extension return date is greater than the target return date for the selected loaner system, yes output of step 1010, then the loaner inventory controller set the extension return date equal to the target return date for the selected loaner system (step 1012).

Subsequently, the loaner inventory controller selects all parts within the selected loaner system with a target return date less than or equal to the extension return date (step 1014). Then, the loaner inventory controller makes a determination as to whether any expiring parts are swappable or replaceable (step 1016). If no expiring parts are swappable, no output of step 1016, then the loaner inventory controller generates and sends a notice via e-mail to the customer to return the selected loaner system (step 1018). Thereafter, the process terminates. If any expiring parts are swappable, yes output of step 1016, then the loaner inventory controller generates and sends an e-mail to the customer to return the swappable parts within the selected loaner system that are required to be replaced to extend the loaner life of the selected loaner system (step 1020). The process terminates thereafter.

Figure 11:
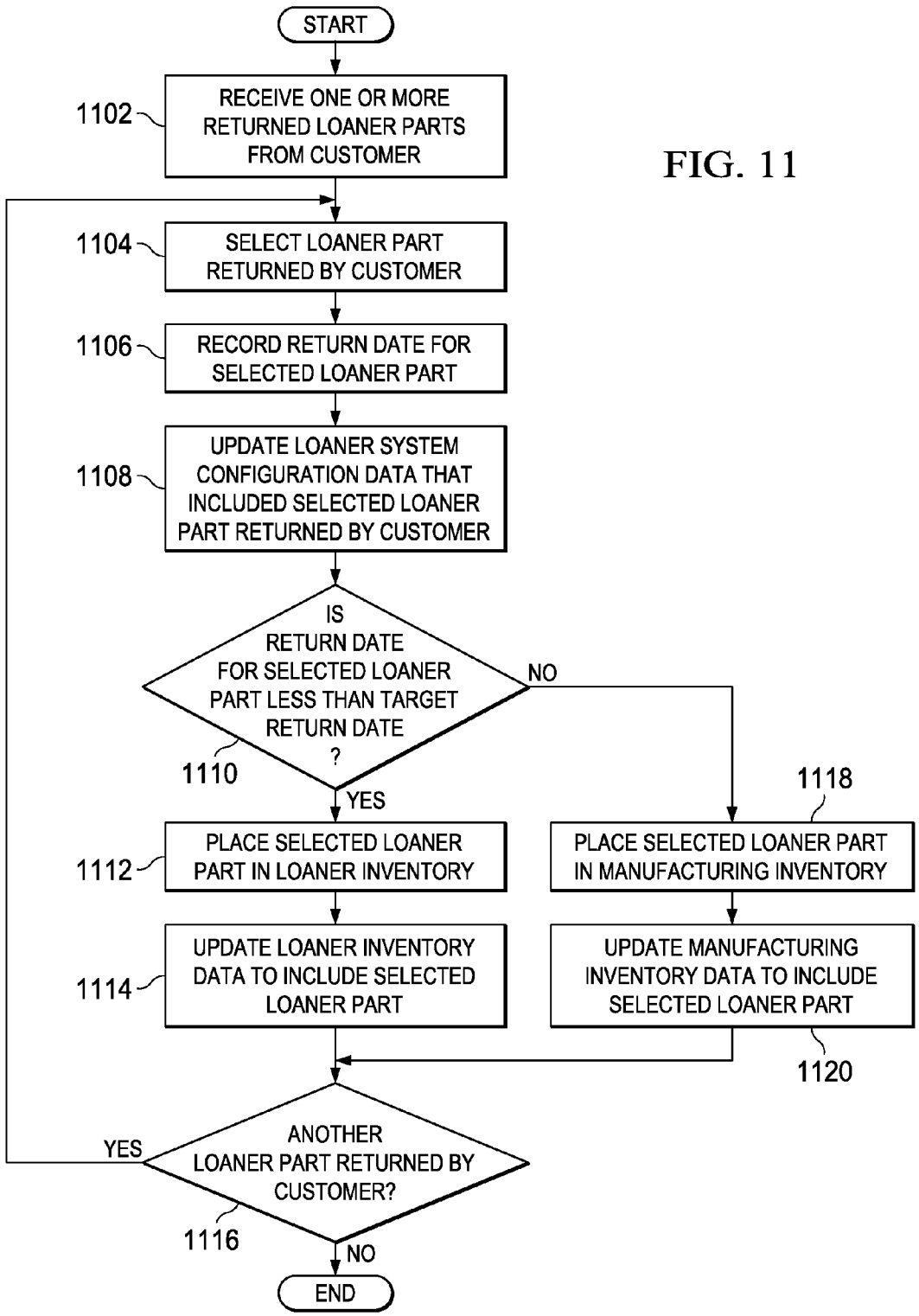
FIG. 11 is a flowchart illustrating an exemplary process for receiving loaner parts in accordance with an illustrative embodiment.

With reference now to FIG. 11, a flowchart illustrating an exemplary process for receiving loaner parts is shown in accordance with an illustrative embodiment. The process shown in FIG. 11 may be implemented in a loaner inventory controller, such as loaner inventory control application 216 in FIG. 2. Also, the process shown in FIG. 11 may be implemented in step 818 of FIG. 8.

The process begins when loaner inventory controller receives one or more returned loaner parts from a customer (step 1102). Then, the loaner inventory controller selects one of the one or more loaner parts returned by the customer (step 1104). Afterward, the loaner inventory controller records the actual return date for the selected loaner part returned by the customer (step 1106).

Subsequently, the loaner inventory controller updates the loaner system configuration data, such as loaner system configuration record 600 in FIG. 6, which includes the selected loaner part (step 1108). Then, the loaner inventory controller makes a determination as to whether the return date for the selected loaner part is less than the target return date (step 1110). If the return date for the selected loaner part is less than the target return date, yes output of step 1110, then the loaner inventory controller places the selected loaner part in the loaner inventory for reuse in the loaner program (step 1112).

Afterward, the loaner inventory controller updates the loaner inventory data to include the selected loaner part (step 1114). Then, the loaner inventory controller makes a determination as to whether another loaner part was returned by the customer (step 1116). If another loaner part was not returned by the customer, no output of step 1116, then the process terminates thereafter. If another loaner part was returned by the customer, yes output of step 1116, then the process returns to step 1104 where the loaner inventory controller selects another returned loaner part.

Returning again to step 1110, if the return date for the selected loaner part is not less than the target return date, no output of step 1110, then the loaner inventory controller places the selected loaner part in the manufacturing inventory for use in new external customer orders (step 1118). Subsequently, the loaner inventory controller updates the manufacturing inventory data to include the selected loaner part (step 1120). Thereafter, the process returns to step 1116 where the loaner inventory controller makes a determination as to whether another loaner part was returned by the customer.

Figure 12:
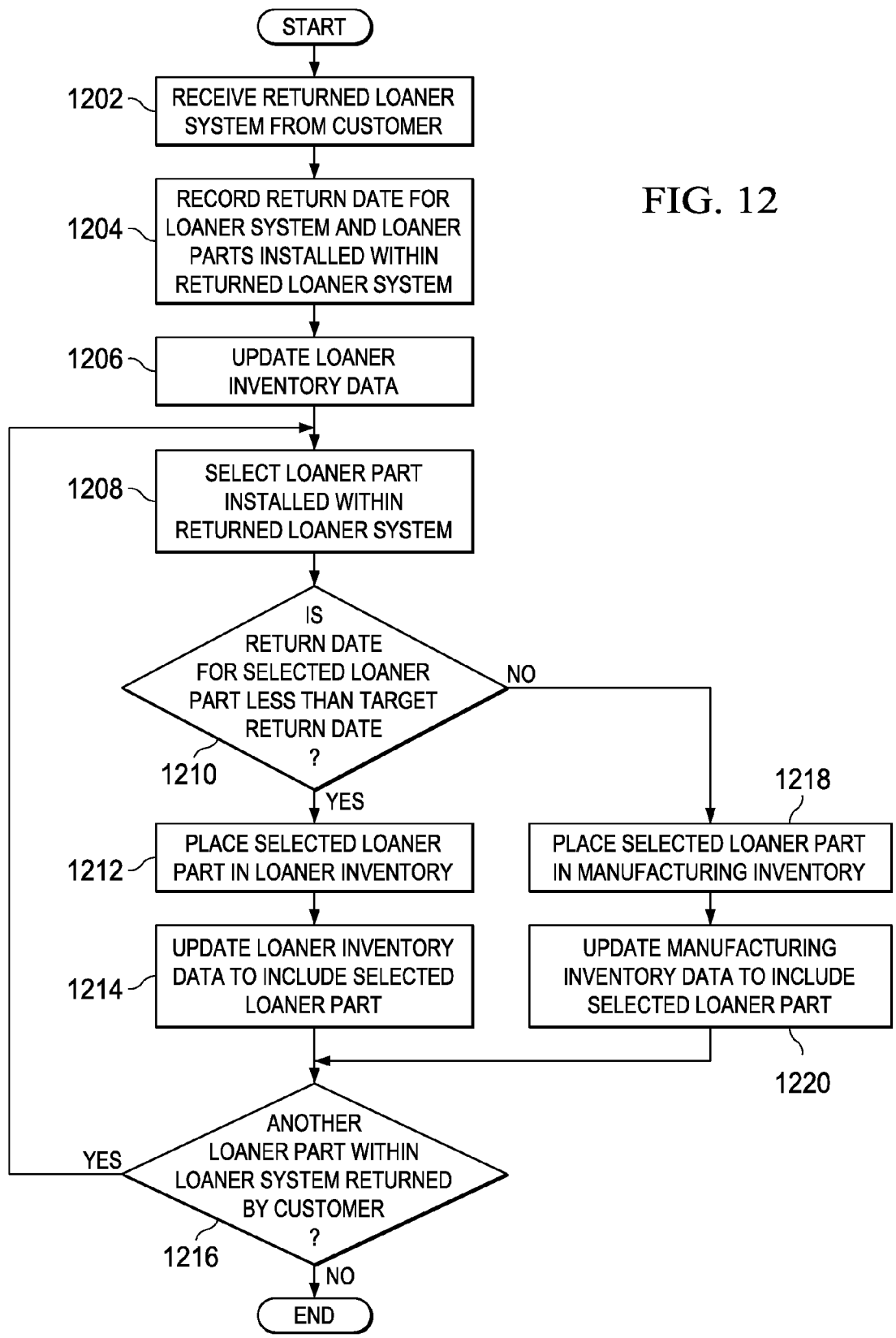
FIG. 12 is a flowchart illustrating an exemplary process for receiving loaner systems in accordance with an illustrative embodiment.

With reference now to FIG. 12, a flowchart illustrating an exemplary process for receiving loaner systems is shown in accordance with an illustrative embodiment. The process shown in FIG. 12 may be implemented in a loaner inventory controller, such as loaner inventory control application 216 in FIG. 2. Also, the process shown in FIG. 12 may be implemented in step 830 of FIG. 8.

The process begins when loaner inventory controller receives a returned loaner system from a customer (step 1202). Afterward, the loaner inventory controller records the actual return date for the loaner system and loaner parts installed within the returned loaner system (step 1204). Subsequently, the loaner inventory controller updates the loaner inventory data accordingly (step 1206).

Then, the loaner inventory controller selects a loaner part installed within the returned loaner system (step 1208). Then, the loaner inventory controller makes a determination as to whether the return date for the selected loaner part is less than the target return date (step 1210). If the return date for the selected loaner part is less than the target return date, yes output of step 1210, then the loaner inventory controller places the selected loaner part in the loaner inventory for reuse in the loaner program (step 1212).

Afterward, the loaner inventory controller updates the loaner inventory data to include the selected loaner part (step 1214). Then, the loaner inventory controller makes a determination as to whether another loaner part is installed within the returned loaner system (step 1216). If another loaner part is not installed within the returned loaner system, no output of step 1216, then the process terminates thereafter. If another loaner part is installed within the returned loaner system, yes output of step 1216, then the process returns to step 1208 where the loaner inventory controller selects another loaner part.

Returning again to step 1210, if the return date for the selected loaner part is not less than the target return date, no output of step 1210, then the loaner inventory controller places the selected loaner part in the manufacturing inventory for use in new external customer orders (step 1218). Subsequently, the loaner inventory controller updates the manufacturing inventory data to include the selected loaner part (step 1220). Thereafter, the process returns to step 1216 where the loaner inventory controller makes a determination as to whether another loaner part is installed within the returned loaner system.

Figure 13:
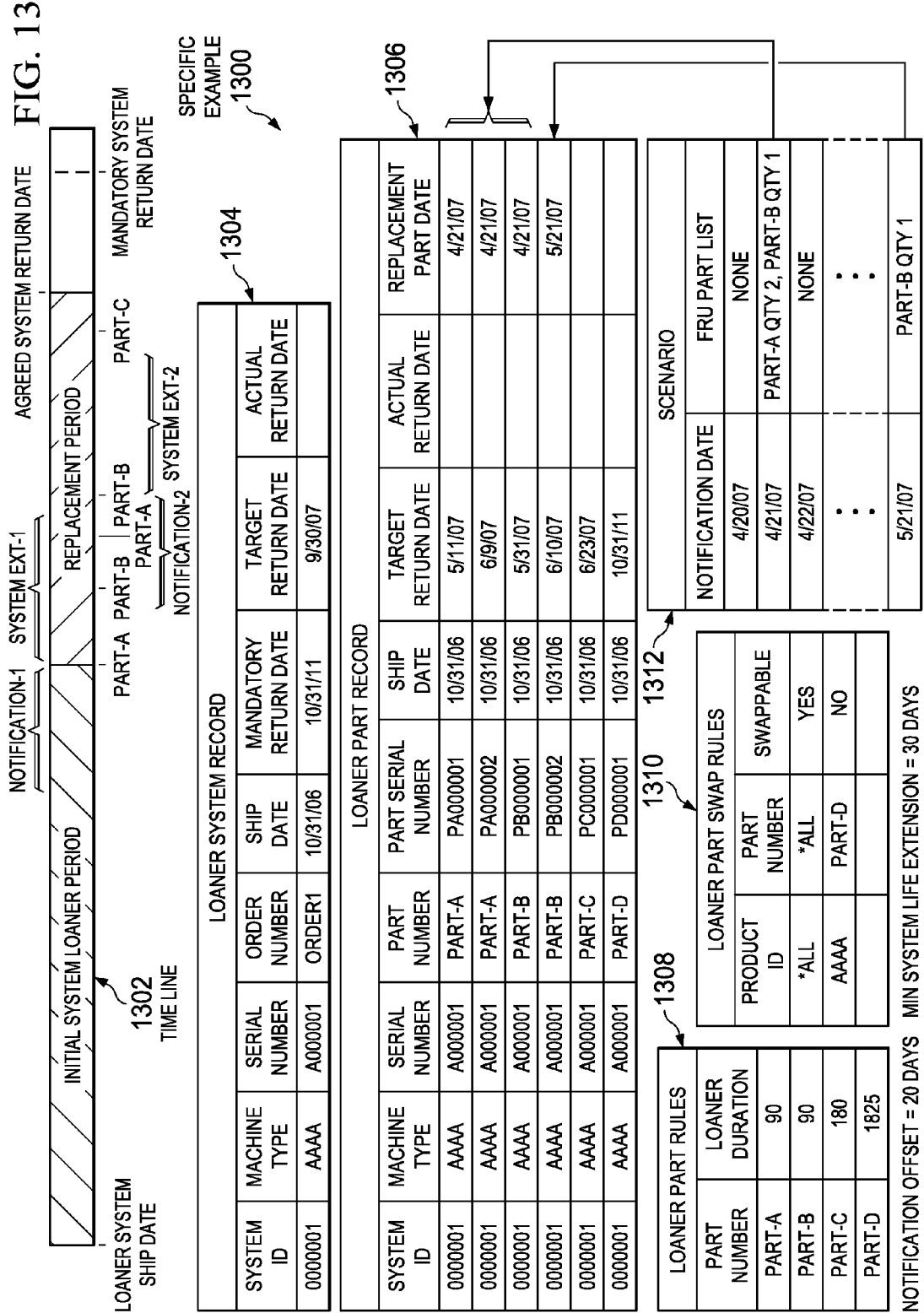
FIG. 13 is an illustration of a specific example for monitoring and managing a given loaner system shipped to an internal customer in accordance with an illustrative embodiment.

With reference now to FIG. 13, an illustration of a specific example for monitoring and managing a given loaner system shipped to an internal customer is depicted in accordance with an illustrative embodiment. Specific example 1300 is an illustrative example of loaner system management by a loaner inventory controller, such as loaner inventory control application 216 in FIG. 2. Specific example 1300 includes time line 1302, loaner system record 1304, loaner part record 1306, loaner part rules 1308, loaner part swap rules 1310, and scenario 1312.

Time line 1302 may, for example, be loaner system time line 700 in FIG. 7. Loaner system record 1304 may, for example, be loaner system configuration record 600 in FIG. 6. Loaner part record 1306 may, for example, be loaner part configuration record 500 in FIG. 5. Loaner part rules 1308 may, for example, be loaner part rules table 300 in FIG. 3. Loaner part rules 1308 defines the loan duration in days that each respective loaner part may be used in the loaner program. Loaner part swap rules 1310 defines whether loaner parts are replaceable. Scenario 1312 indicates that the date on which a notification was sent to the customer to return swappable loaner parts in the identified loaner system, a replacement part order was generated on the same date for those swappable parts required to be returned by the customer.

Thus, illustrative embodiments of the present invention provide a computer implemented method, system, and computer program product for automatically replacing loaner parts within a loaner system to prevent loaner system callback. The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can store the program for use by or in connection with the instruction execution system, apparatus, or device.

The computer-readable medium can be an electronic, magnetic, optical, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/WN) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a computer for automatically replacing loaner parts within a loaner system to prevent loaner system callback, the computer implemented method comprising computer implemented steps of:

responsive to selecting a loaner system within loaner inventory data to form a selected loaner system, determining, by the computer, whether the selected loaner system is required to be returned by a customer based on an agreed target return date for the selected loaner system prior to a mandatory return date for the selected loaner system that is set based on an earliest legal usage limit of a non-replaceable loaner part within the selected loaner system;

responsive to determining that the selected loaner system is required to be returned based on the agreed target return date, determining, by the computer, whether the customer requests an extension to an initial loan period for the selected loaner system during a notification offset period;

responsive to determining that the customer does request the extension to the initial loan period for the selected loaner system, determining, by the computer, whether to grant the extension for the selected loaner system based on the customer agreeing to a part expiration profile that indicates required replacement loaner part shipments to prevent any loaner part legal usage limit expiration in the selected loaner system;

responsive to determining that the selected loaner system is not required to be returned, generating and sending, by the computer, a notification automatically to a customer to return expiring loaner parts within the selected loaner system during the extension to the initial loan period;

generating, by the computer, a part replacement order automatically for replacement loaner parts for each of the expiring loaner parts;

shipping, by the computer, the replacement loaner parts automatically to the customer to replace the expiring loaner parts to prevent callback of the selected loaner system;

responsive to receiving a returned loaner part from the customer, determining, by the computer, whether a return date for the returned loaner part is less than a target return date for the returned loaner part;

responsive to determining that the return date for the returned loaner part is less than the target return date, placing, by the computer, the returned loaner part into a loaner inventory for reuse in another loaner system; and responsive to determining that the return date for the returned loaner part is not less than the target return date, placing, by the computer, the returned loaner part into a manufacturing inventory for use in building a new customer order.

2. The computer implemented method of claim 1, further comprising:

responsive to selecting a part within the selected loaner system to form a selected part, determining whether the selected part is time sensitive based on the selected part being listed in a loaner part rules table;

responsive to determining that the selected part is time sensitive, adding an entry for the selected part to a configuration record for the selected loaner system; and setting the target return date equal to a ship date for the selected loaner system plus a maximum loan duration for the selected part.

3. The computer implemented method of claim 2, further comprising:

determining whether the selected part is swappable within the selected loaner system based on loaner part swap rules.

4. The computer implemented method of claim 1, wherein the extension to the initial loan period for the selected loaner system is a minimum system life extension period, wherein the minimum system life extension period is a minimum amount of time granted for the extension, and wherein all loaner parts within the selected loaner system that expire during the minimum system life extension period has corresponding part replacement orders automatically generated and corresponding replacement loaner parts automatically shipped to the customer.

5. The computer implemented method of claim 1, wherein loaner part rules establish the legal usage limit for each loaner part installed in the selected loaner system.

6. The computer implemented method of claim 1, wherein the notification is automatically sent to the customer via e-mail.

7. The computer implemented method of claim 1, wherein the notification offset period is a predetermined number of days before the agreed target return date.

8. The computer implemented method of claim 2, wherein the part is time sensitive when the part is listed in the loaner part rules table, and wherein the part is not time sensitive when the part is not listed in the loaner part rules table.

9. The computer implemented method of claim 3, wherein the loaner part swap rules define whether the selected part is replaceable within the selected loaner system to extend a life of the selected loaner system in a loaner program.

10. A computer program product stored in a non-transitory computer readable storage medium having computer usable program code embodied therein that is executable by a computer to perform a method, comprising:

determining whether a selected loaner system is required to be returned by a customer based on an agreed target return date for the selected loaner system in response to selecting a loaner system within loaner inventory data prior to a mandatory return date for the selected loaner system that is set based on an earliest legal usage limit of a non-replaceable loaner part within the selected loaner system;

determining whether the customer requests an extension to an initial loan period for the selected loaner system during a notification offset period in response to determining that the selected loaner system is required to be returned based on the agreed target return date;

determining whether to grant the extension for the selected loaner system based on the customer agreeing to a part expiration profile that indicates required replacement loaner part shipments to prevent any loaner part legal usage limit expiration in the selected loaner system in response to determining that the customer does request the extension to the initial loan period for the selected loaner system;

automatically generating and sending a notification to a customer to return expiring loaner parts within the selected loaner system during the extension to the initial loan period in response to determining that the selected loaner system is not required to be returned;

automatically generating a part replacement order for replacement loaner parts for each of the expiring loaner parts;

automatically shipping the replacement loaner parts to the customer to replace the expiring loaner parts to prevent callback of the selected loaner system;

determining whether a return date for a returned loaner part is less than a target return date for the returned loaner part in response to receiving the returned loaner part from the customer;

placing the returned loaner part into a loaner inventory for reuse in another loaner system in response to determining that the return date for the returned loaner part is less than the target return date; and placing the returned loaner part into a manufacturing inventory for use in building a new customer order in response to determining that the return date for the returned loaner part is not less than the target return date.

11. The computer program product of claim 10, the method further comprising:

determining whether a selected part is time sensitive based on the selected part being listed in a loaner part rules table in response to selecting a part within the selected loaner system;

adding an entry for the selected part to a configuration record for the selected loaner system in response to determining that the selected part is time sensitive; and setting the target return date equal to a ship date for the selected loaner system plus a maximum loan duration for the selected part.

12. The computer program product of claim 11, the method further comprising:

determining whether the selected part is swappable within the selected loaner system based on loaner part swap rules.

* * * * *